United States Patent
Shaik et al.

(10) Patent No.: US 11,887,385 B2
(45) Date of Patent: Jan. 30, 2024

(54) CAMERA-BASED IN-CABIN OBJECT LOCALIZATION

(71) Applicant: FORD GLOBAL TECHNOLOGIES, LLC, Dearborn, MI (US)

(72) Inventors: Faizan Shaik, Farmington Hills, MI (US); Robert Parenti, Dearborn, MI (US); Medha Karkare, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 39 days.

(21) Appl. No.: 17/379,247

(22) Filed: Jul. 19, 2021

(65) Prior Publication Data
US 2023/0013133 A1   Jan. 19, 2023

(51) Int. Cl.
| | | |
|---|---|---|
| *G06T 7/70* | (2017.01) | |
| *G06N 20/00* | (2019.01) | |
| *G06V 20/59* | (2022.01) | |
| *B60R 21/015* | (2006.01) | |

(52) U.S. Cl.
CPC ...... *G06V 20/593* (2022.01); *B60R 21/01538* (2014.10); *B60R 21/01554* (2014.10); *G06N 20/00* (2019.01); *G06T 7/70* (2017.01); *G06T 2207/30268* (2013.01)

(58) Field of Classification Search
CPC ............ G06V 20/593; B60R 21/01538; B60R 21/01554; G06T 7/70; G06T 2207/30268; G06N 20/00
USPC ........................................................ 348/148
See application file for complete search history.

(56) References Cited

U.S. PATENT DOCUMENTS

| | | | |
|---|---|---|---|
| 7,415,126 B2 | 8/2008 | Breed et al. | |
| 7,623,950 B2 | 11/2009 | Kong et al. | |
| 2006/0291697 A1 | 12/2006 | Luo | |
| 2016/0092734 A1* | 3/2016 | Loce | G06V 10/42 |
| | | | 382/103 |
| 2017/0068863 A1* | 3/2017 | Rattner | G06V 40/10 |
| 2017/0286761 A1* | 10/2017 | Zackay | G06T 7/73 |
| 2021/0081688 A1* | 3/2021 | Bazargan | G06V 40/10 |
| 2021/0188205 A1* | 6/2021 | Adusumalli | G06K 9/6267 |
| 2021/0206515 A1* | 7/2021 | Stefanowski | G01M 5/0016 |
| 2022/0028114 A1* | 1/2022 | Lee | G06T 7/521 |

(Continued)

OTHER PUBLICATIONS

Artan et al., Occupancy Detection in Vehicles Using Fisher Vector Image Representation, arXiv: 1312.6024.

(Continued)

*Primary Examiner* — Nathan J Flynn
*Assistant Examiner* — Caroline Somera
(74) *Attorney, Agent, or Firm* — Brooks Kushman P.C.; Frank Lollo (57) ABSTRACT

Performing object localization inside a cabin of a vehicle is provided. A camera image is received of a cabin of a vehicle by an image sensor at a first location with respect to a plurality of seating zones of a vehicle. Object detection on the camera image is performed to identify one or more objects in the camera image. A machine-learning model trained on images taken at the first location is utilized to place the one or more objects into the seating zones of the vehicle according to a plurality of bounding boxes corresponding to the plurality of seating zones for the first location.

14 Claims, 5 Drawing Sheets

(56) References Cited

U.S. PATENT DOCUMENTS

| | | | | |
|---|---|---|---|---|
| 2022/0114817 A1* | 4/2022 | Gronau | .................. | G06T 7/277 |
| 2022/0398408 A1* | 12/2022 | Shaik | ..................... | G01S 7/417 |

OTHER PUBLICATIONS

Lee et al., A Framework for Detecting Vehicle Occupancy Based on the Occupant Labeling Method, Hindawi Journal of Advanced Transportation, vol. 2020, Article ID 8870211.

Nowruzi et al., In-Vehicle Occupancy Detection with Convolutional Networks on Thermal Images, Proceedings of the IEEE/CVF Conference on Computer Vision and Pattern Recognition (CVPR) Workshops, 2019.

Pavlidis et al., Automatic Passenger Counting in the HOV Lane, Minnesota Department of Transportation, Jun. 1999.

\* cited by examiner

CAMERA-BASED IN-CABIN OBJECT LOCALIZATION

TECHNICAL FIELD

Aspects of the disclosure relate to object localization inside a cabin of a vehicle.

BACKGROUND

Vehicle features may involve detection of persons, objects, and their locations in the vehicle. Such features may include driver monitoring systems (DMS), child seat alerts, and passenger monitoring. These features may make use of in-vehicle cameras to detect the persons and objects.

SUMMARY

In one or more illustrative examples, a system for performing object localization inside a cabin of a vehicle is provided. The system includes one or more computing devices programmed to receive a camera image taken of a cabin of a vehicle by an image sensor at a first location with respect to a plurality of seating zones of a vehicle; perform object detection on the camera image to identify one or more objects in the camera image; and utilize a machine-learning model trained on images taken at the first location to place the one or more objects into the seating zones of the vehicle according to a plurality of bounding boxes corresponding to the plurality of seating zones for the first location.

In one or more illustrative examples, a method for performing object localization inside a cabin of a vehicle is provided. A camera image is received of a cabin of a vehicle by an image sensor at a first location with respect to a plurality of seating zones of a vehicle. Object detection on the camera image is performed to identify one or more objects in the camera image. A machine-learning model trained on images taken at the first location is utilized to place the one or more objects into the seating zones of the vehicle according to a plurality of bounding boxes corresponding to the plurality of seating zones for the first location.

In one or more illustrative examples, a non-transitory computer-readable medium includes instructions for performing object localization inside a cabin of a vehicle that, when executed by one or more computing devices cause the one or more computing devices to perform operations including to: receive a camera image taken of a cabin of a vehicle by an image sensor at a first location with respect to a plurality of seating zones of a vehicle; perform object detection on the camera image to identify one or more objects in the camera image; and utilize a machine-learning model trained on images taken at the first location to place the one or more objects into the seating zones of the vehicle according to a plurality of bounding boxes corresponding to the plurality of seating zones for the first location.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Locating the position of persons and objects in the vehicle cabin is useful for loading passenger-specific profiles. While radio detection and ranging (RADAR) may be used to localize objects, RADAR sensors may be unsuitable for other tasks such as face recognition or eye gaze detection. Using a monocular camera that is also used for DMS, face recognition for localizing a person or object may be performed using a three-dimensional (3D) model of the cabin. Further aspects of the approach are discussed in detail herein.

Figure 1:
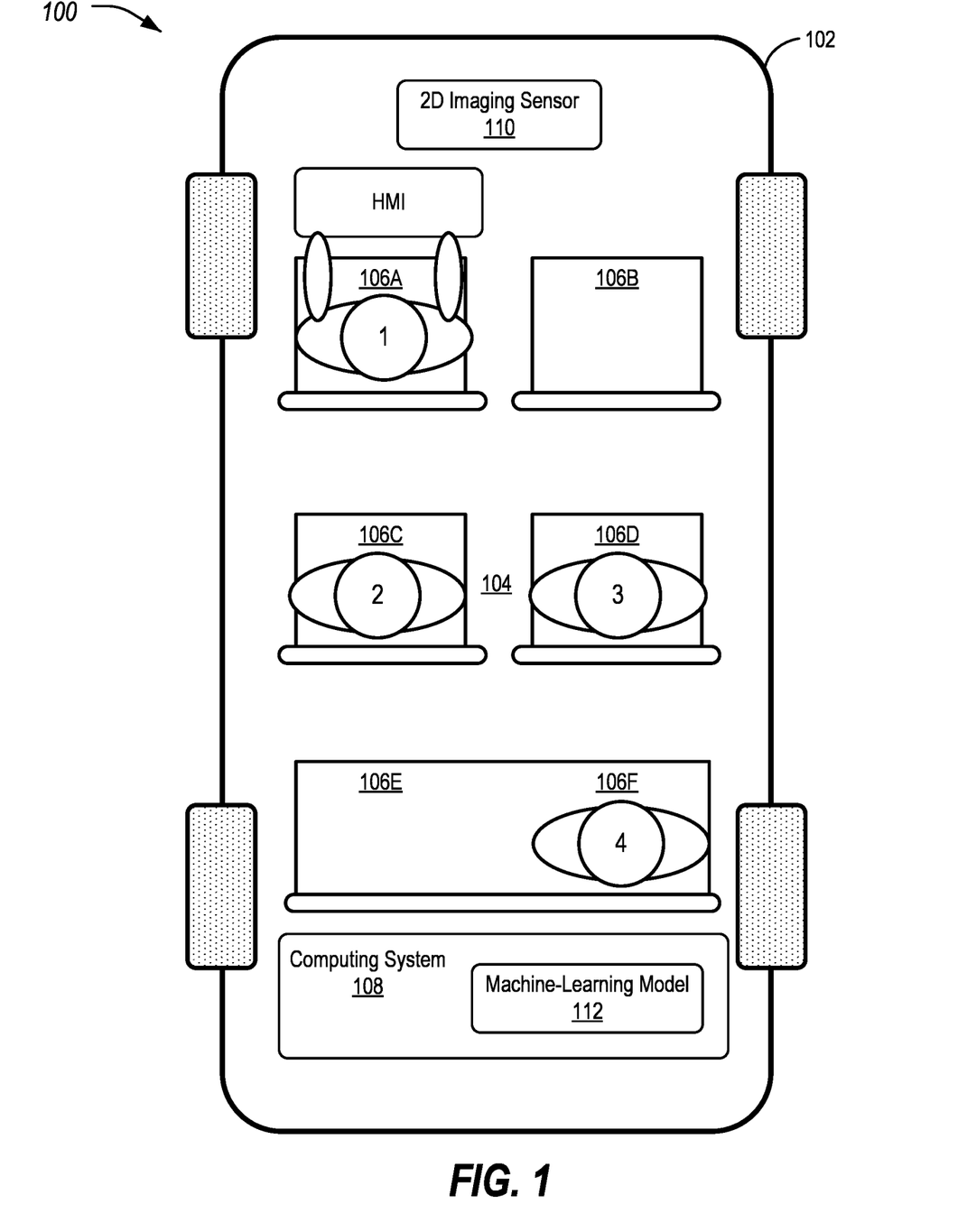
FIG. 1 illustrates an example system including a vehicle implementing an approach to object localization inside the cabin of the vehicle.

FIG. 1 illustrates an example system 100 including a vehicle 102 implementing an approach to object localization inside the cabin 104 of the vehicle 102. The vehicle 102 may include a computing system 108 configured to provide computing services to the vehicle 102. The vehicle 102 may further include one or more 2D image sensors 110 configured to capture images of the interior of the cabin 104 of the vehicle 102. As explained in detail herein, data from the 2D image sensors 110 may be used to assign 3D areas of the vehicle cabin 104 to objects detected within the image data.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle powered by both an internal combustion engine and one or more electric motors, such as a series hybrid electric vehicle, a parallel hybrid electrical vehicle or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 interior may be divided into multiple seating zones 106, where each seating zone 106 is associated with a seating position within the vehicle 102 interior. For instance, a front row of the illustrated vehicle 102 may include a first seating zone 106A associated with the driver seating position, and a second seating zone 106B associated with a front passenger position. A second row of the illustrated vehicle 102 may a third seating zone 106C associated with a driver-side second-row seating position and a fourth seating zone 106D associated with a passenger-side second-row seating position. A third row of the illustrated vehicle 102 may include a fifth seating zone 106E associated with a driver-side third-row seating position and a sixth seating zone 106F associated with a passenger-side third-row seating position. As shown in the illustrated example, a first person is located in the first seating zone 106A, a second person is located in the third seating zone 106C, a third person is located in the fourth seating zone 106D, and a fourth person is located in the sixth seating zone 106F. Variations on the number and arrangement of seating zones 106 are possible. As some other possibilities, an alternate second row may include three seating zones 106, or the vehicle 102 may include more or fewer rows.

The computing system 108 may be configured to perform various tasks with respect to monitoring the vehicle cabin 104. For instance, the computing system 108 may perform occupancy detection to determine which seating zones 106 of the vehicle 102 are occupied (here, seating zones 106A, 106C, 106D, and 106F). In another example, the computing system 108 may perform driver monitoring to ensure that the driver is attentive to the driving task.

The 2D image sensors 110 may include cameras or other imaging sensors configured to generate 2D image data of the vehicle cabin 104. In many examples the 2D image data may be stored as a rectangular array of pixels, where each pixel corresponds to a portion of the image. In some examples, the image data may be a single color or channel, forming a single matrix of pixels. In other examples, the image data may be a color image having separate pixel values for multiple color channels, such as red, green, and blue.

A machine-learning model 112, such as a trained neural network, may be used to perform in-cabin object detection. This object detection may include, for example, occupancy detection of seating zones 106. In another example, the object detection may further determine pose, attentiveness, or other aspects of identified individuals within the vehicle 102. In yet a further example, the object detection may include detection of other objects within the vehicle 102, such as animals, toolboxes, electronic devices, other physical objects, etc. The machine-learning model 112 may be further trained to localize the detected persons or objects into the seating zones 106 according to a 3D model of the cabin 104.

Figure 2:
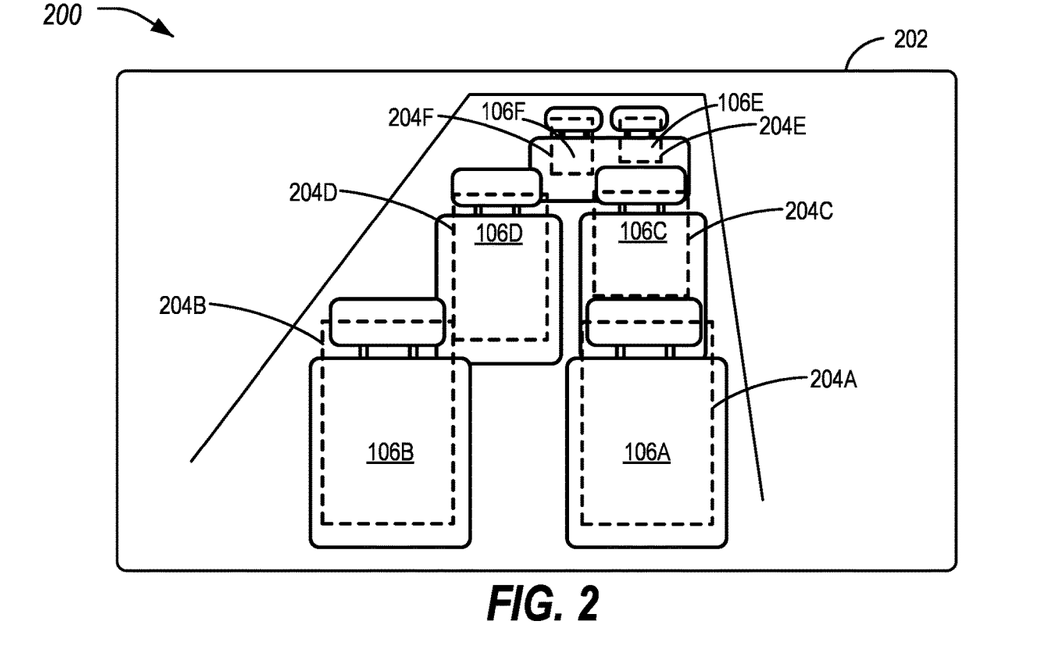
FIG. 2 illustrates an example image camera image taken by a two-dimensional (2D) image sensor from a first vantage point within the vehicle.

FIG. 2 illustrates an example 200 of a camera image 202 taken by the 2D image sensor 110 from a first vantage point within the vehicle 102. As shown, the vehicle 102 includes a plurality of seating zones 106, where for each seating zone 106 there is a corresponding bounding box 204. Specifically, in the illustrated example 200, a first bounding box 204A corresponds to the first seating zone 106A, a second bounding box 204B corresponds to the second seating zone 106B, a third bounding box 204C corresponds to the third seating zone 106C, a fourth bounding box 204D corresponds to the fourth seating zone 106D, a fifth bounding box 204E corresponds to the fifth seating zone 106E, and a sixth bounding box 204F corresponds to the sixth seating zone 106F.

Figure 3:
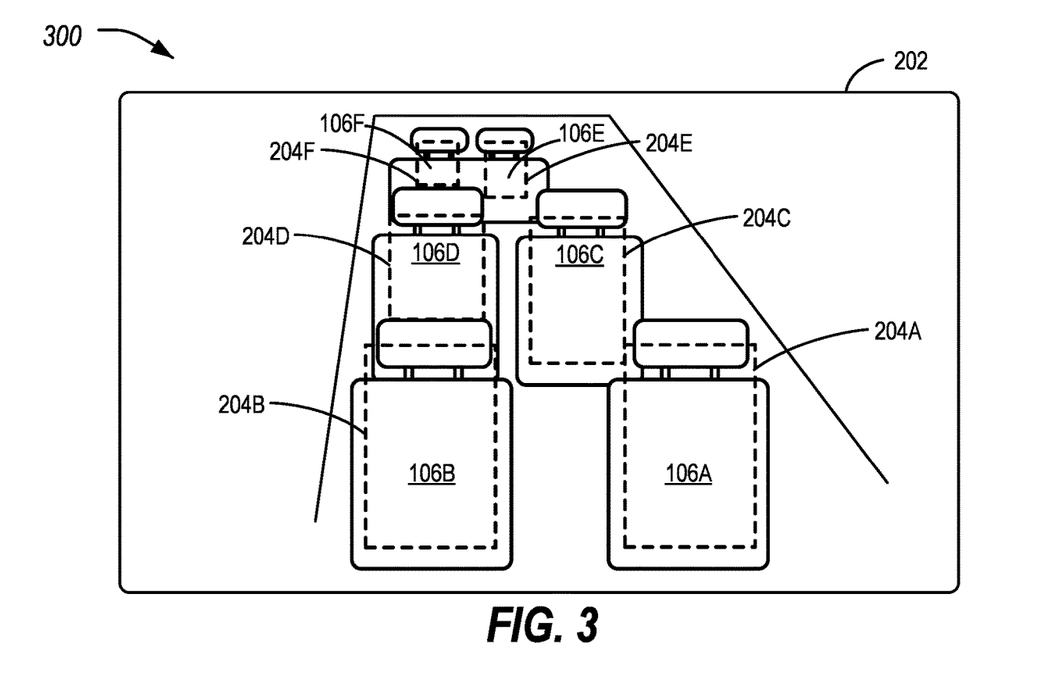
FIG. 3 illustrates an example image camera image taken by a 2D image sensor from a second vantage point within the vehicle.

FIG. 3 illustrates an example 300 of a camera image 202 taken by the 2D image sensor 110 from a second vantage point within the vehicle 102. For instance, the 2D image sensor 110 taking the camera image 202 in the example 300 may be a different 2D image sensor 110 in the same vehicle 102 as shown in the example 200. Or, the 2D image sensor 110 taking the camera image 202 in the example 300 may be the same 2D image sensor 110. Or, the 2D image sensor 110 taking the camera image 202 in the example 300 may be located in a different vehicle 102 entirely.

The machine-learning model 112 may be trained to identify the bounding boxes 204 specific to the location of the 2D image sensor 110 in the cabin 104 of the vehicle 102. Once trained, provided the 2D image sensor 110 remains at the same location, the machine-learning model 112 may be used to identify whether objects are detected in the bounding boxes 204. Moreover, as each of the bounding boxes 204 may be mapped to a corresponding seating zone 106, the machine-learning model 112 having identified an object within a bounding box 204 may also inform with respect to the 3D location of the object within the vehicle 102.

Regardless, as can be seen, the bounding boxes 204 in the example 300 are at different locations in the camera image 202 as compared to the bounding boxes 204 in the example 200. Thus, a static mapping of bounding boxes 204 may not unsuitable across different vehicles 102 or across different vantage points for image capture within the same vehicle 102.

Figure 4:
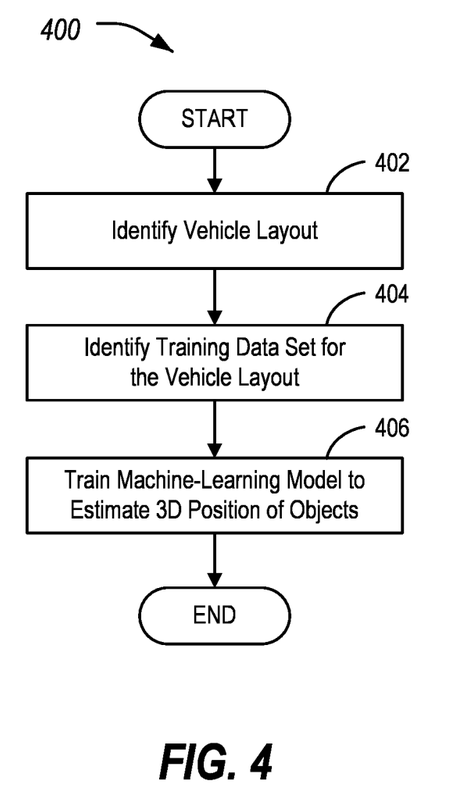
FIG. 4 illustrates an example process for training the machine-learning model to place objects in the vehicle.

FIG. 4 illustrates an example process 400 for training the machine-learning model 112 to place objects in the vehicle 102. In an example the process 400 may be performed by the computing system 108 of the vehicle 102, in the context of the system 100. In another example, the process 400 may be performed by a computing device external to the vehicle 102 for download to the vehicle 102.

At operation 402, the computing system 108 identifies a layout of the vehicle 102. In an example, the computing system 108 may receive interior specifications of the vehicle 102 as an input. This may include, for instance, a number of rows of seating zones 106 in the vehicle 102 and/or a number of seats per row. In another example, the computing system 108 may perform image recognition on camera images 202 from the 2D image sensors 110 using a neural network trained to identify seating zones in an image. The layout may further indicate the location of the 2D image sensor 110 with respect to the vehicle cabin 104.

At operation 404, the computing system 108 retrieves a training set corresponding to the layout of the cabin 104. In an example, the computing system 108 may receive annotated images from an operator as an input. In another example, the computing system 108 may access a data store of annotated images of various vehicle cabins 104 and may select images that correspond to the layout of the vehicle 102. The annotated images may include a labeling of persons and/or objects in the images along with their seating zone 106 locations. The images may include images taken at the same location as the 2D image sensor 110 with respect to the vehicle cabin 104. In other examples, the images may be taken from a different position in the vehicle cabin 104 and may be projected to correspond to the location of the 2D image sensor 110 with respect to the vehicle cabin 104. This projection may be accomplished, for example, by detecting source points in an original image (e.g., using a HoughLine Transform to identify straight lines in the image corresponding to seats in the cabin 104), determining crossing points of horizontal and vertical lines from the identification, and transforming the crossing points using a transformation matrix (e.g., a homogenous transformation) to map to the crossing points of seats in the cabin 104 from a different perspective.

At operation 406, the computing system 108 trains the machine-learning model 112. In an example, the computing system 108 uses the data of the images as input to the machine-learning model 112 and the annotations as the ground truth output to train the weights and biases of the machine-learning model 112. In one example, the machine-learning model 112 is a linear regression model utilizing stochastic gradient descent. One or more passes over the training images may be used until the algorithms converges to suitable predictions of 3D locations of the objects consistent with the annotations. After operation 406, the process 400 ends.

Figure 5:
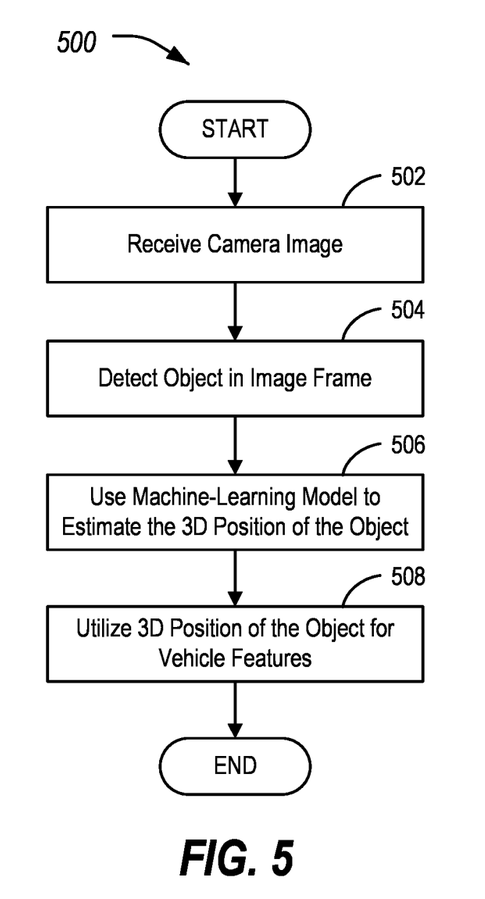
FIG. 5 illustrates an example process for using the machine-learning model to place objects in the vehicle.

FIG. 5 illustrates an example process 500 for using the machine-learning model 112 to place objects in the vehicle 102. In an example the process 500 may be performed by the computing system 108 of the vehicle 102, in the context of the system 100. In an example, the process 500 may be performed from a single image from the 2D image sensor 110. In another example, the process 500 may be performed over time on a stream of images received from the 2D image sensor 110.

At operation 502, the computing system 108 receives a camera image 202. In an example, the computing system 108 may receive an image from the 2D image sensor 110 of the vehicle cabin 104.

At operation 504, the computing system 108 detects objects in the camera image 202. The objects may be detected using a region of interest of the entire image 202, for example. For each detected object, the computing system 108 may track a bounding box location of the detected object. For implementations performed over time on a stream of images, a Kalman Filter may be used on the bounding boxes of each of the detected objects for the camera image 202 to track objects and more quickly predict the positions of bounding boxes across frames. The Kalman Filter may base an initial prediction of bounding box location on a detection of objects for a prior camera image 202 frame, which may then be updated based on the actual new frame.

At operation 506, the computing system 108 uses the machine-learning model 112 to locate the detected objects into the seating zones 106 of the vehicle 102. The machine-learning model 112 may be trained on the bounding boxes 204 to predict the seating position and may, for instance, use a linear regression algorithm to predict the seating position. This may allow the computing system 108 to use the bounding boxes 204 to determine a row and a seat (X, Z) in which the object is located. In a specific example, this may include determining the seating zone 106 in which a person is seated.

At operation 508, the computing system 108 uses the location of the detected objects to perform vehicle 102 features. In an example, the locations may be used for one or more of DMS, child seat alerts, and passenger monitoring. After operation 508, the process 500 ends.

Figure 6:
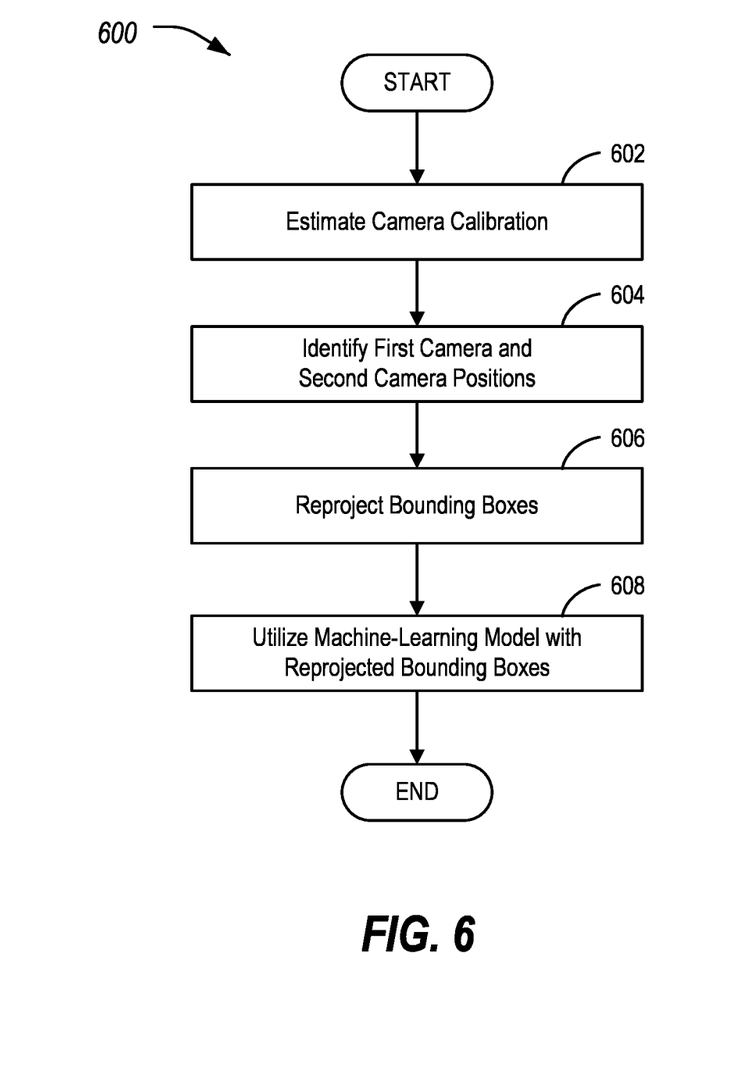
FIG. 6 illustrates an example process for adapting the machine-learning model to operate for a different vantage point in the vehicle cabin.

FIG. 6 illustrates an example process 600 for adapting the machine-learning model 112 to operate for a different vantage point in the vehicle cabin 104. For example, the process 600 may be used to translate a machine-learning model 112 trained with bounding boxes 204 for a location of a first 2D image sensor 110 to operate with translated bounding boxes 204 for a location of a second 2D image sensor 110. In an example, as described the process 600 may be performed by the computing system 108 of the vehicle 102, in the context of the system 100. In another example, it should be noted that the process 600 may alternately be performed by a computing device external to the vehicle 102 for download to the computing system 108 of the vehicle 102.

At operation 602, the computing system 108 estimates a calibration of the 2D image sensor 110. For instance, the computing system 108 may estimate the extrinsic camera calibration between old camera position and new installed camera. For instance, the 2D image sensor 110 may be initially located at position $T_1$ (X, Y, Z) and this position may be changed to $T_2$ (X, Y, Z). Data may then be projected from the new position $T_2$ to $T_1$ using a homogenous transformation. The transformation matrix may be pre-computed according to $T_1$ and $T_2$.

At operation 604, the computing system 108 identifies locations of the first 2D image sensor 110 and the second 2D image sensor 110. These locations may be identified, for example, with respect to a reference point of the vehicle cabin 104. For instance, the computing system 108 may identify a position of the first 2D image sensor 110 with respect to the center of the cabin 104, and may further identify a position of the second 2D image sensor 110 with respect to the center of the cabin 104.

At operation 606, the computing system 108 projects the bounding boxes 204 of the machine-learning model 112 using a geometry defined by the locations of the first 2D image sensor 110 and the second 2D image sensor 110. For instance, the computing system 108 may utilize the transformation matrix determined at operation 602 to project the locations of the bounding boxes 204 to the new position.

At operation 608, the computing system 108 uses the reprojected bounding boxes 204 to locate the detected objects into the seating zones 106 of the vehicle 102. For instance, the computing system 108 may perform the process 500 using the reprojected bounding boxes 204 for the new location of the 2D image sensor 110. After operation 608, the process 600 ends.

Figure 7:
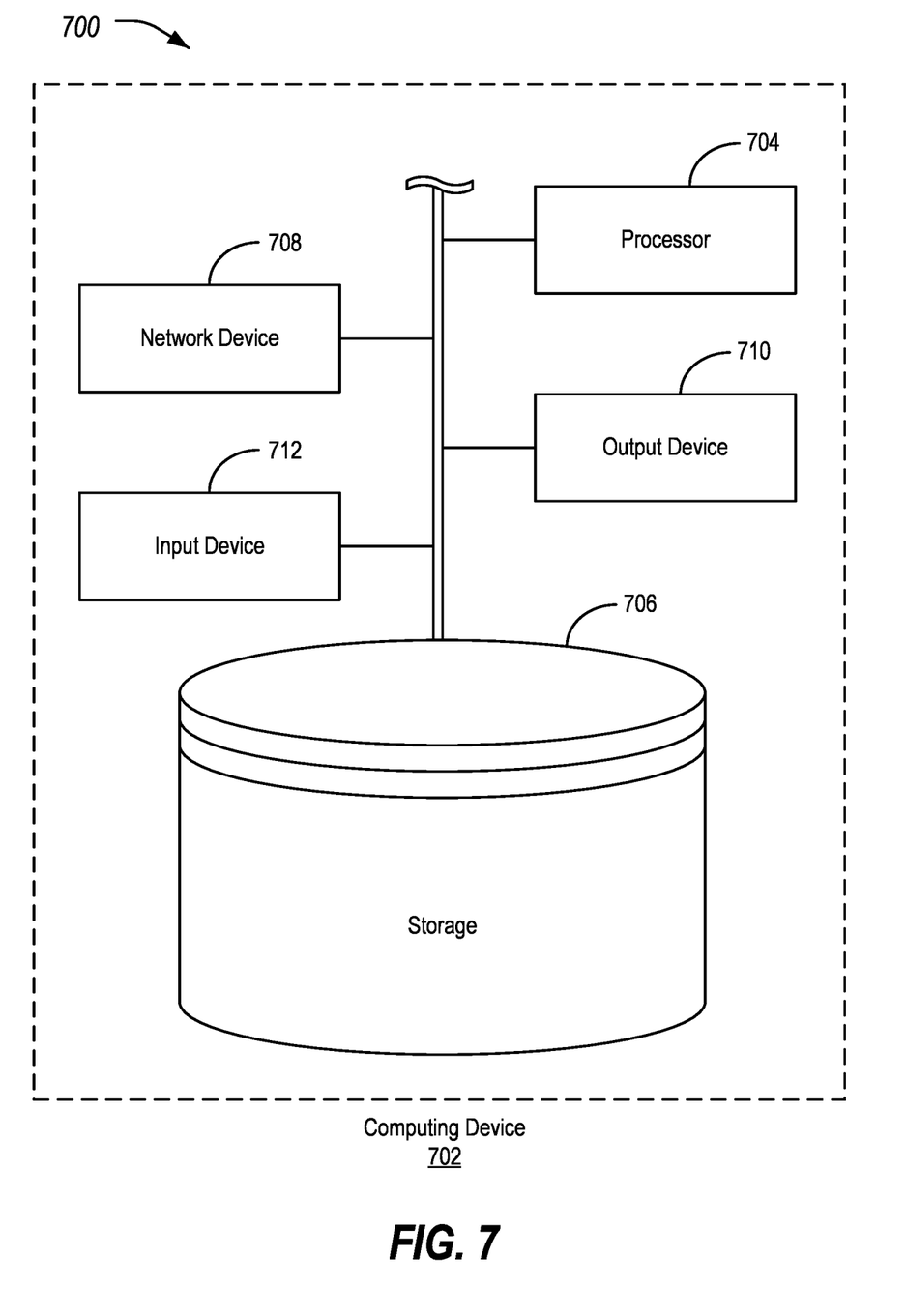
FIG. 7 illustrates an example of a computing device for use implementing the sensor fusion to build active areas of interest for efficient processing of deep learning models.

FIG. 7 illustrates an example 700 of a computing device 702 for use in implementing the aforementioned training, using, and adapting of the machine-learning model 112. Referring to FIG. 7, and with reference to FIGS. 1-6, the computing system 108 may be an example of such a computing device 702. As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable computing device 702 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for performing object localization inside a cabin of a vehicle, comprising:
   one or more computing devices programmed to
      maintain a machine-learning model trained on images taken at a first location within a cabin of a vehicle, the vehicle having a seating zone configuration having a plurality of seating zones, the machine-learning model configured to place one or more objects into the seating zones according to a plurality of bounding boxes corresponding to the plurality of seating zones from a vantage point of the first location;
      receive a camera image taken of the cabin of the vehicle by an image sensor at a second location with respect to the plurality of seating zones of the vehicle;
      project the plurality of bounding boxes based on a geometry defined by the first location and the second location to adapt the machine-learning model to a vantage point of the second location;
      perform object detection on the camera image to identify the one or more objects in the camera image; and
      utilize the machine-learning model trained on the images taken at the first location to place the one or more objects into the seating zones of the vehicle according to the projected plurality of bounding boxes corresponding to the plurality of seating zones from the vantage point of the second location.

2. The system of claim 1, wherein the one or more computing devices are further programmed to utilize a homogenous transformation precomputed based on the first location and the second location to project the plurality of bounding boxes for the first location to conform to the second location.

3. The system of claim 1, wherein the seating zone configuration of the vehicle includes a number of rows of seating zones in the vehicle and a number of seating zones for each of the rows.

4. The system of claim 1, wherein the training data images include images taken at the first location.

5. The system of claim 1, wherein the training data images include images taken at a second location, and wherein the one or more computing devices are further programmed to project the images taken at the second location to conform to images taken at the first location using a homogenous transformation precomputed based on the first location and the second location.

6. A method for performing object localization inside a cabin of a vehicle, comprising:
maintaining a machine-learning model trained on images taken at a first location within a cabin of a vehicle, the vehicle having a seating zone configuration having a plurality of seating zones, the machine-learning model configured to place one or more objects into the seating zones according to a plurality of bounding boxes corresponding to the plurality of seating zones from a vantage point of the first location;
receiving a camera image taken of the cabin of the vehicle by an image sensor at a second location with respect to the plurality of seating zones of the vehicle;
projecting the plurality of bounding boxes based on a geometry defined by the first location and the second location to adapt the machine-learning model to a vantage point of the second location;
performing object detection on the camera image to identify the one or more objects in the camera image; and
utilizing the machine-learning model trained on the images taken at the first location to place the one or more objects into the seating zones of the vehicle according to the projected plurality of bounding boxes corresponding to the plurality of seating zones from the vantage point of the second location.

7. The method of claim 6, further comprising utilizing a homogenous transformation precomputed based on the first location and the second location to project the plurality of bounding boxes for the first location to conform to the second location.

8. The method of claim 6, wherein the seating zone configuration of the vehicle includes a number of rows of seating zones in the vehicle and a number of seating zones for each of the rows.

9. The method of claim 6, wherein the training data images include images taken at the first location.

10. The method of claim 6, wherein the training data images include images taken at a second location, and further comprising projecting the images taken at the second location to conform to images taken at the first location using a homogenous transformation precomputed based on the first location and the second location.

11. A non-transitory computer-readable medium comprising instructions for performing object localization inside a cabin of a vehicle that, when executed by one or more computing devices cause the one or more computing devices to perform operations including to:
maintain a machine-learning model trained on images taken at a first location within a cabin of a vehicle, the vehicle having a seating zone configuration having a plurality of seating zones, the machine-learning model configured to place one or more objects into the seating zones according to a plurality of bounding boxes corresponding to the plurality of seating zones from a vantage point of the first location;
receive a camera image taken of the cabin of the vehicle by an image sensor at a second location with respect to the plurality of seating zones of the vehicle;
project the plurality of bounding boxes based on a geometry defined by the first location and the second location to adapt the machine-learning model to a vantage point of the second location;
perform object detection on the camera image to identify the one or more objects in the camera image; and
utilize the machine-learning model trained on the images taken at the first location to place the one or more objects into the seating zones of the vehicle according to the plurality of bounding boxes corresponding to the plurality of seating zones for the first location.

12. The medium of claim 11, further comprising instructions that, when executed by the one or more computing devices cause the one or more computing devices to perform operations including to utilize a homogenous transformation precomputed based on the first location and the second location to project the plurality of bounding boxes for the first location to conform to the second location.

13. The medium of claim 11, wherein the seating zone configuration of the vehicle includes a number of rows of seating zones in the vehicle and a number of seating zones for each of the rows.

14. The medium of claim 11, wherein the training data images include images taken at the first location and images taken at a second location, the medium further comprising instructions that, when executed by the one or more computing devices cause the one or more computing devices to perform operations including to project the images taken at the second location to conform to the images taken at the first location using a homogenous transformation precomputed based on the first location and the second location.

* * * * *